United States Patent
Altschul

[11] Patent Number: 5,845,218
[45] Date of Patent: Dec. 1, 1998

[54] DISPOSABLE WIRELESS TELEPHONE AND METHOD

[76] Inventor: Randice-Lisa Altschul, 36 Cecilia Ave., Cliffside Park, N.J. 07010

[21] Appl. No.: 808,339

[22] Filed: Feb. 28, 1997

[51] Int. Cl.⁶ .............................. H04Q 7/32; H04M 17/00
[52] U.S. Cl. ............................................. 455/565; 455/407
[58] Field of Search ...................................... 455/406, 407, 455/409, 405, 11.1, 550, 565, 575, 90, 347; 379/112, 114, 130, 144

[56] References Cited

U.S. PATENT DOCUMENTS

| | | |
|---|---|---|
| D. 340,714 | 10/1993 | Hoffman . |
| D. 369,167 | 4/1996 | Hanson et al. . |
| 4,210,870 | 7/1980 | Kallio-Konno . |
| 4,776,000 | 10/1988 | Parienti ................................... 379/144 |
| 4,783,799 | 11/1988 | Maass . |
| 4,831,647 | 5/1989 | D'Avello et al. . |
| 4,856,046 | 8/1989 | Streck et al. . |
| 4,881,254 | 11/1989 | Hollewed et al. . |
| 4,916,441 | 4/1990 | Gombrich . |
| 4,951,308 | 8/1990 | Bishop et al. ........................... 379/144 |
| 5,138,650 | 8/1992 | Stahl et al. . |
| 5,161,250 | 11/1992 | Ianna et al. . |
| 5,220,593 | 6/1993 | Zicker et al. . |
| 5,233,642 | 8/1993 | Renton . |
| 5,301,223 | 4/1994 | Amadon et al. . |
| 5,307,508 | 4/1994 | Rollins et al. ............................. 455/90 |
| 5,327,482 | 7/1994 | Yamamoto . |
| 5,359,182 | 10/1994 | Schilling . |
| 5,365,570 | 11/1994 | Boubelik . |
| 5,376,931 | 12/1994 | Marrs . |
| 5,388,148 | 2/1995 | Seiderman . |
| 5,438,612 | 8/1995 | Norimatsu . |
| 5,461,664 | 10/1995 | Cappadona . |
| 5,504,808 | 4/1996 | Hamrick, Jr. ............................. 379/144 |
| 5,511,114 | 4/1996 | Stimson et al. . |
| 5,517,555 | 5/1996 | Amadon et al. . |
| 5,541,985 | 7/1996 | Ishii et al. . |
| 5,550,897 | 8/1996 | Seiderman . |
| 5,563,934 | 10/1996 | Eda . |
| 5,577,100 | 11/1996 | McGregor et al. ...................... 455/406 |
| 5,577,109 | 11/1996 | Stimson et al. . |
| 5,579,379 | 11/1996 | D'Amico et al. . |
| 5,583,918 | 12/1996 | Nakagawa . |
| 5,592,537 | 1/1997 | Moen . |
| 5,608,778 | 3/1997 | Partridge, III . |
| 5,615,260 | 3/1997 | Kurgan . |
| 5,621,787 | 4/1997 | McKoy et al. . |
| 5,625,669 | 4/1997 | McGregor et al. . |
| 5,627,886 | 5/1997 | Bowman . |
| 5,629,977 | 5/1997 | Fonseca . |
| 5,673,306 | 9/1997 | Amadon et al. . |
| 5,673,309 | 9/1997 | Woynoski et al. . |
| 5,675,636 | 10/1997 | Gray . |
| 5,677,945 | 10/1997 | Mullins et al. . |
| 5,684,861 | 11/1997 | Lewis et al. . |

FOREIGN PATENT DOCUMENTS

| | | |
|---|---|---|
| 2262685 | 6/1993 | United Kingdom . |
| 92/16078 | 9/1992 | WIPO . |
| 96/03001 | 2/1996 | WIPO . |

*Primary Examiner*—Reinhard J. Eisenzopf
*Assistant Examiner*—Lester G. Kincaid
*Attorney, Agent, or Firm*—Arthur Jacob

[57] ABSTRACT

A disposable wireless telephone and a method of using a disposable wireless telephone capable of use for telephonic communications only during a predetermined limited period, after which period the telephone is rendered inoperative and is discarded.

13 Claims, 3 Drawing Sheets

DISPOSABLE WIRELESS TELEPHONE AND METHOD

The present invention relates generally to telephonic communications and pertains, more specifically, to a disposable wireless telephone and method for facilitating the use of wireless telephones.

The increasing popularity of wireless telephones, prompted by the widespread availability of cellular wireless telephone services, has led to a demand for more convenience and greater availability in wireless telephones and more economical wireless telephone use. The present invention places wireless telephone services within the easy reach of a greater population, thereby facilitating telephonic communication among increased numbers of people, in business and commercial fields as well as in domestic and personal uses.

Thus, the present invention provides a disposable wireless telephone and method for facilitating the use of wireless telephones. As such, the present invention attains several objects and advantages, some of which may be summarized as follows: Simplifies and renders more economical the use of wireless telephone services; renders wireless telephone services available to a larger audience at lowered cost; facilitates the distribution and use of wireless telephones; reduces the expense of wireless telephones and wireless telephone services; promotes the use of wireless telephones and wireless telephone services by those who otherwise would not invest in a wireless telephone and expend funds for wireless telephone services; facilitates the availability of wireless telephones and wireless telephone services for emergency uses; provides added convenience in obtaining as well as using wireless telephones and wireless telephone services.

The above object and advantages, as well as further objects and advantages, are attained by the present invention which may be described briefly as a disposable wireless telephone capable of use for telephonic communication only during a predetermined limited period, after which period the telephone is rendered inoperative for telephonic communication and is discarded, the telephone comprising: telephonic means for transmitting and receiving telephonic communications; enabling/disabling means for enabling the telephonic means for telephonic communications during the predetermined limited period and disabling the telephonic means for telephonic communications upon expiration of the predetermined limited period; and selective operating means for operating the telephonic means for telephonic communications of selected durations, the enabling/disabling means being responsive to the selective operating means such that telephonic communication is disabled for telephonic communications when the sum of the selected durations reaches the predetermined limited period, whereby the telephone is rendered inoperative beyond the predetermined limited period and is capable of being discarded.

In addition, the present invention includes a method of using a disposable wireless telephone for telephonic communications during only the duration of a predetermined limited period, after which period the telephone is rendered inoperative and is discarded, the telephone including telephonic means for transmitting and receiving telephonic communications, the method comprising: enabling the telephonic means for telephonic communications during the duration of the predetermined limited period; operating the telephonic means for telephonic communications of selected durations; and disabling telephonic communication through the telephonic means upon the sum of the selected durations reaching the duration of the predetermined limited period, whereby the telephone is rendered inoperative beyond the predetermined limited period and is capable of being discarded.

The invention will be understood more fully, while still further objects and advantages will become apparent, in the following detailed description of preferred embodiments of the invention illustrated in the accompanying drawing, in which.

Figure 1:
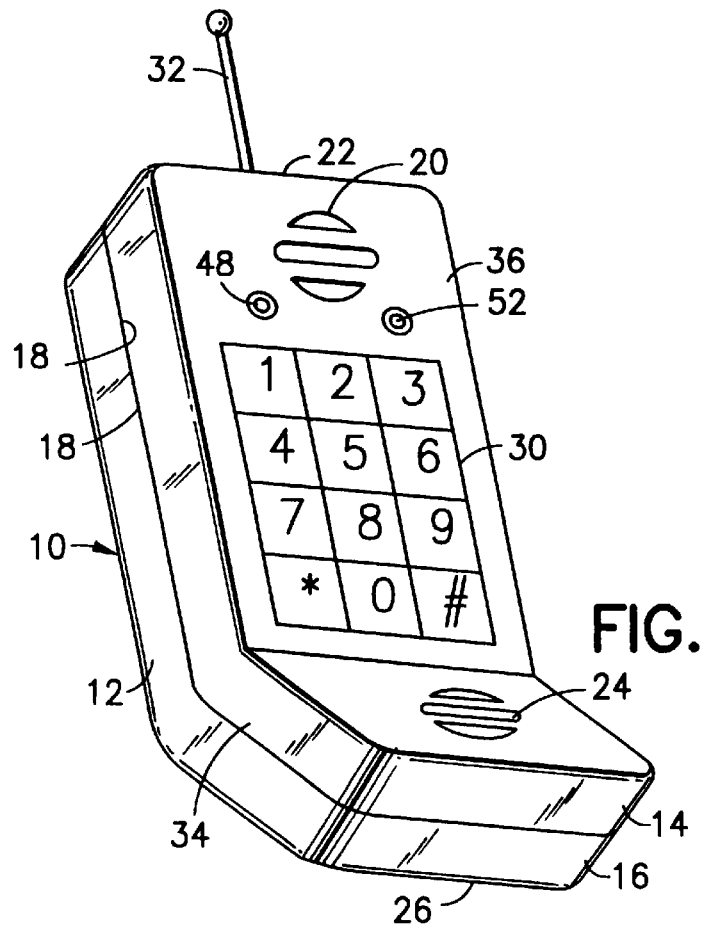
FIG. 1 is pictorial perspective view of a disposable wireless telephone constructed in accordance with one aspect of the present invention.
Figure 2:
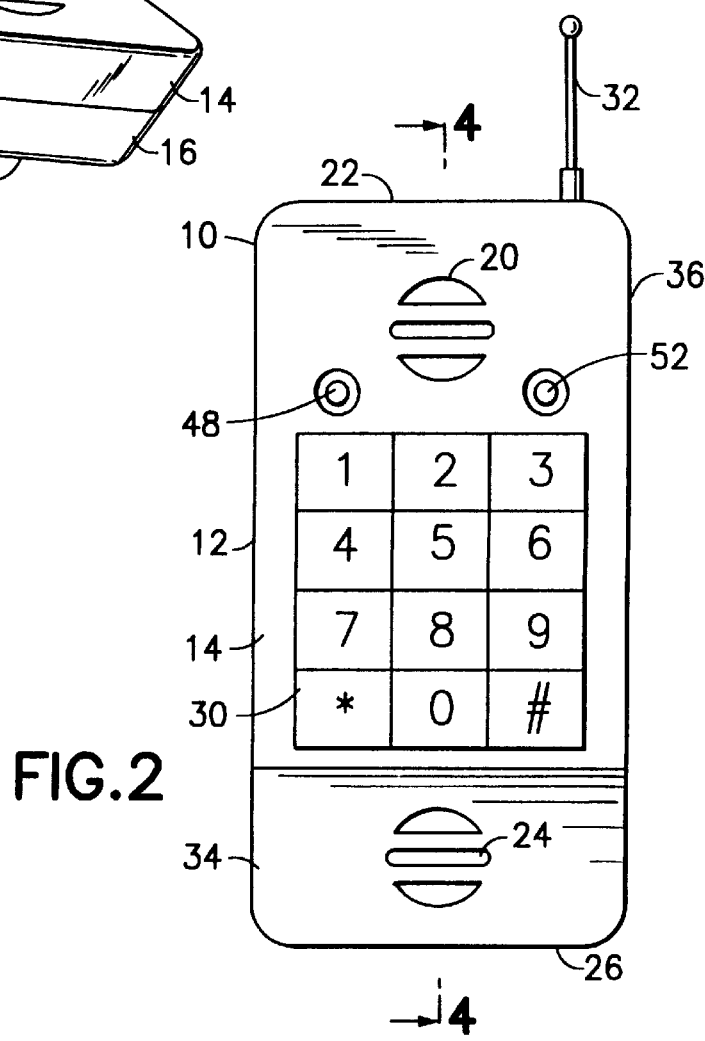
FIG. 2 is a front elevational view of the disposable wireless telephone.
Figure 3:
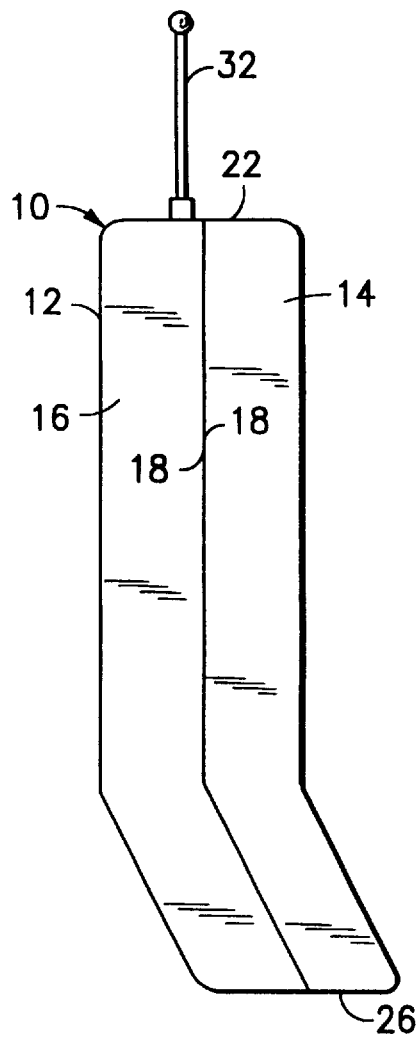
FIG. 3 is a side elevational view of the disposable wireless telephone.

Referring now to the drawing, and especially to FIGS. 1 through 3 thereof, a disposable wireless telephone is illustrated generally at 10 and is seen to include a case 12 having a front case member 14 and a rear case member 16, joined together along abutting edges 18. An earphone grille portion 20 is located adjacent an upper end 22 of the case 12, and a microphone grille portion 24 is located adjacent a lower end 26 of the case 12. Intermediate the upper and lower ends 22 and 26 is a keypad 30, and an antenna 32 extends upwardly from the upper end 22. The case 12 includes a case wall 34 which provides the telephone 10 with an overall outer configuration 36 designed for aesthetic as well as for functional purposes.

Figure 4:
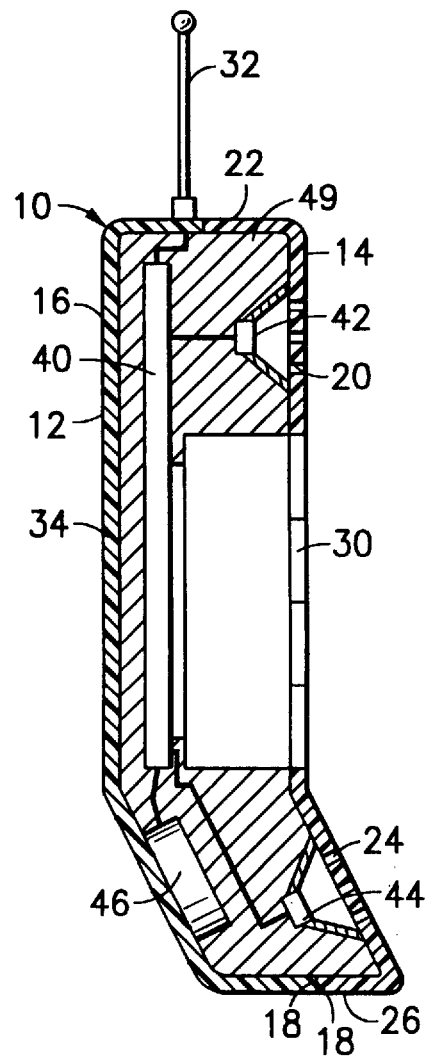
FIG. 4 is a cross-sectional view taken along line 4—4 of FIG. 2.

Turning now to FIG. 4, a circuit board 40 is located within the case 12 and is connected to an earphone 42 placed behind the earphone grille portion 20, a microphone 44 placed behind the microphone grille portion 24, the keypad 30 and the antenna 32. The electronic components of the telephone 10 are carried by the circuit board 40 and a power source in the form of a power battery 46, connected to the circuit board 40 through a power switch 48 (see FIGS. 1 and 2), provides the power necessary to operate the telephone 10. In the preferred arrangement, the case wall 34 is relatively thin and is constructed of a relatively inexpensive synthetic polymeric material, such as by vacuum forming the front case member 14 and the rear case member 16 from thin sheets of ABS or styrene, the sheets typically having a thickness of about 0.060 inch. The illustrated components then are located within the case 12 and the case 12 is closed permanently, as by welding or by adhesive bonding along the abutting edges 18 of the case members 14 and 16. Prior to sealing the case 12 closed, a matrix 49 is placed in the case 12 so that the components located within the case 12 are embedded within the matrix 49 and cannot be accessed without destruction of the working arrangement of component parts. Additionally the matrix 49 serves as a filler which mechanically reinforces the relatively thin wall 34 of the case 12. The matrix 49 preferably is constructed of a synthetic polymeric material, such as an epoxy resin, or a mastic-like material currently available for such use. In this manner, tampering is deterred. In total, the described construction is relatively inexpensive and therefore readily expendable.

Figure 5:
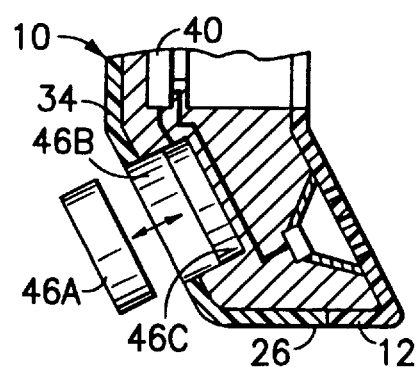
FIG. 5 is a fragment of a cross-sectional view similar to FIG. 4, but showing an alternate arrangement.

In an alternate arrangement illustrated in FIG. 5, the power source includes an external power battery 46A, rather than the internal power battery 46, the external power battery 46A being received within a receptacle 46B in the case 12 and connected to circuit board 40, through power switch 48, by means of an electrical connector 46C. In this manner, power battery 46A may be recovered for further use, while telephone 10 is discarded, or an exhausted power battery 46A may be disposed of separately, in compliance with environmental considerations.

Figure 6:
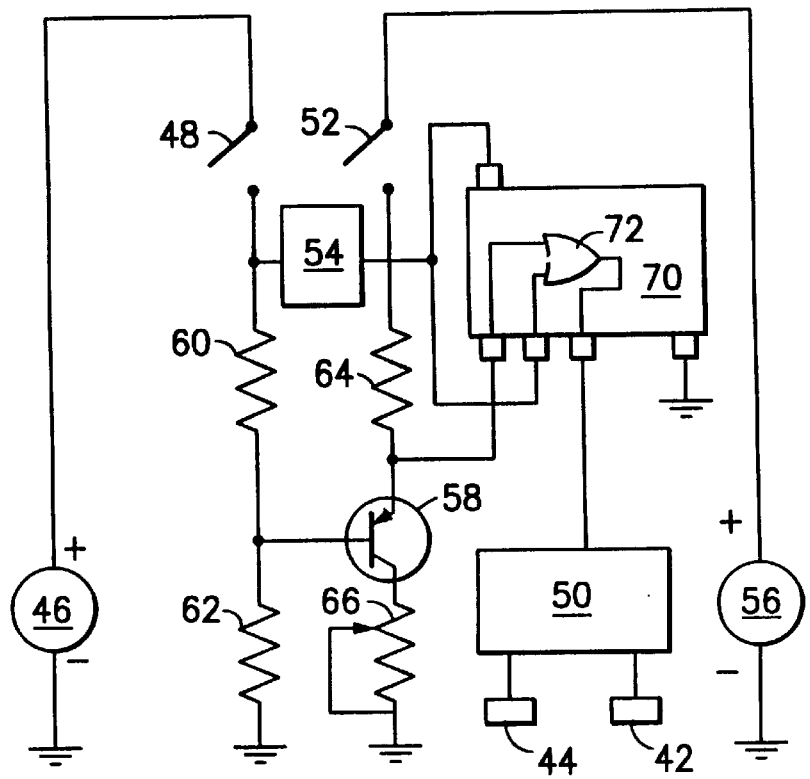
FIG. 6 is a schematic diagram showing a portion of the operating circuitry of the disposable wireless telephone.

Telephone 10 is rendered disposable by virtue of being capable of use only for the duration of a predetermined limited period, after which period telephone 10 is inoperative and is discarded. To that end, telephone 10 includes component parts which enable only limited use and ready disposal. Referring now to FIG. 6, as well as to FIG. 4, the circuitry incorporated into telephone 10, and located primarily on circuit board 40, is shown in schematic fashion and is seen to include telephonic means in the form of conventional wireless telephone circuitry 50 for receiving and transmitting wireless telephonic communications.

Enabling/disabling means are incorporated for enabling telephonic communication for only a predetermined limited period, and disabling telephonic communication upon expiration of the predetermined limited period, whereby telephone 10 is rendered inoperative and is capable of being discarded at the end of the predetermined limited period. In the embodiment illustrated in FIG. 6, telephone 10 includes selective operating means for operating the telephonic means for telephonic communications of selected durations. Thus, the selective operating means is shown in the form of a send/receive switch 52 selectively operated by the user of the telephone 10 to send a telephonic communication when a telephone call is to be made, and to terminate the telephonic communication when the call is complete. In this instance, switch 52 is actuated manually between an "on" mode and an "off" mode to effect a telephonic communication having a duration corresponding to the time during which switch 52 is in the "on" mode. With the power switch 48 turned on, power from the power battery 46 is supplied, through a voltage regulator 54, to the wireless telephonic circuitry 50, as follows.

Setting means is utilized for determining the duration of the predetermined limited period over which the telephone 10 will be operative. In the illustrated embodiment, the setting means includes a setting battery 56 of selected, known capacity. With the power switch 48 in the "on" position and switch 52 in the "on" mode, setting battery 56 is connected to the collector of a transistor 58, and the transistor 58 is biased by the power battery 46. The choice of the values for resistors 60, 62, 64 and 66 will determine the rate of flow of current from the setting battery 56, and thus will provide a measured duration based upon the life of the setting battery 56. For example, where the setting battery 56 has a capacity of 30 mAH and the values of resistors 60, 62, 64 and 66 are chosen to draw 30 mA when switch 52 is in the "on" mode, the measured duration provided by the life of the setting battery 56 will be one hour.

An integrated circuit 70 provides an AND gate 72 interposed between the voltage regulator 54 and the telephone circuitry 50 and connected to the collector of the transistor 58 such that at the end of the measured duration provided by the life of the setting battery 56, power to the telephone circuitry will be discontinued by the AND gate 72, which serves as a disabling means, so that the telephone circuitry 50 will be disabled and telephone 10 will become inoperative. Accordingly, each time the switch 52 is placed in the "on" mode to make a telephone call, current will flow from the setting battery 56 at the selected rate. When the switch 52 is placed in the "off" mode at the end of the telephone call, the duration of the telephone call will have drained a given amount of the capacity of setting battery 56. When the sum of the durations of the telephone calls reaches the measured duration provided by the life of the setting battery 56, the telephone circuitry 50 is disabled and the telephone 10 becomes inoperative and is discarded.

Figure 7:
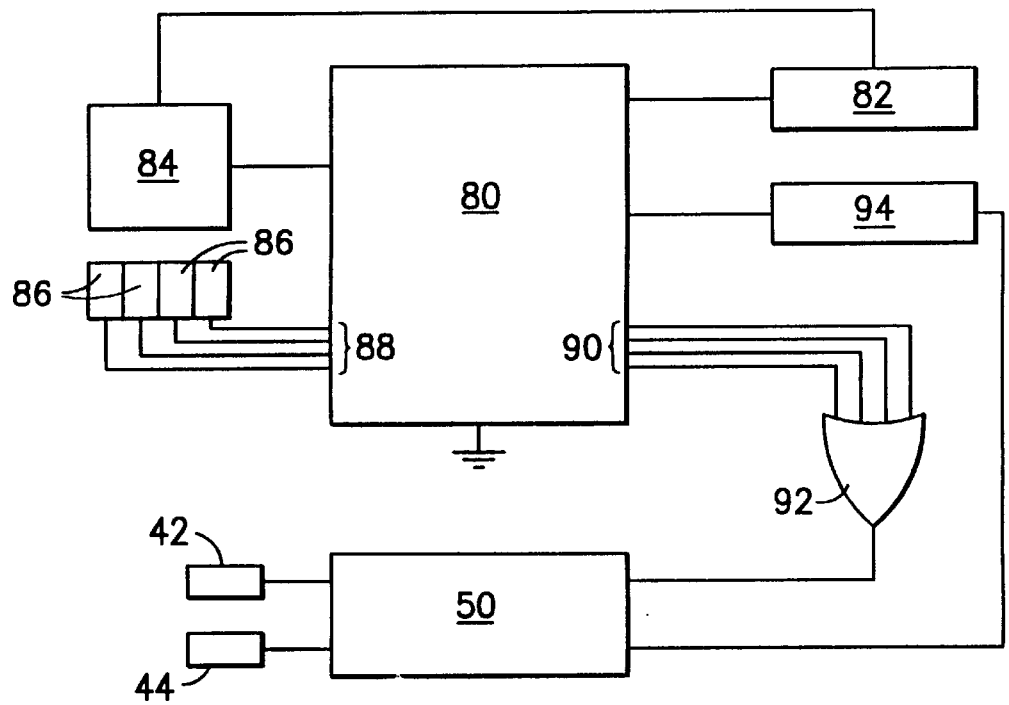
FIG. 7 is a schematic diagram showing an alternate embodiment.

In an alternate arrangement illustrated in FIG. 7, the setting means includes a timing mechanism 80 powered continuously by a power supply 82 and connected to an oscillator 84, which also is powered by the power supply 82 and supplies the timing mechanism 80 with a timing signal. Selector means, shown in the form of manually operated thumb wheels 86, enable the input of a prescribed time into the timing mechanism 80, through input terminals 88. Output terminals 90 of the timing mechanism 80 are connected to the telephone circuitry 50 through an OR gate 92. A start/stop indicator 94 is responsive to the send/receive switch 52 such that upon the initiation of a telephone call, a start signal is provided to the timing mechanism 80 and upon completion of the telephone call, a stop signal is provided to the timing mechanism 80, enabling the timing mechanism 80, in concert with the oscillator 84, to count toward the prescribed time set into the timing mechanism 80 by the thumb wheels 86, for the duration of each telephone call, and thus compare the sum of the selected durations to the prescribed time set into the timing mechanism 80. When the sum of the durations of the telephone calls reaches the prescribed time set into the timing mechanism 80, the OR gate 92, which serves as a disabling means, discontinues power to the telephone circuitry 50, so that the telephone circuitry 50 will be disabled and telephone 10 will become inoperative.

In both of the alternatives illustrated in FIGS. 6 and 7, once the setting means is set for the predetermined limited period, the setting means is embedded within the matrix 49, along with the remainder of the internal components of the telephone 10, as described above, so as to deter tampering which could alter the duration of the predetermined limited period.

Each of the alternatives illustrated in FIGS. 6 and 7 provides a simple and economical arrangement for enabling telephone 10 to be constructed at minimal cost for use for only a predetermined limited period, after which period the telephone 10 is inoperative and may be discarded. These alternatives are provided by way of example, other alternative arrangements being available for assuring that the telephone 10 is rendered operative only for a predetermined limited time. Thus, telephones 10 constructed in accordance with the present invention may be purchased at a relatively low price and made available at a very wide variety of sales outlets. In this manner, wireless telephones and wireless telephone services are made available to a much wider population for convenience as well as for emergency uses, with economy.

It will be seen that the present invention attains the several objects and advantages summarized above; namely: Simplifies and renders more economical the use of wireless telephone services; renders wireless telephone services available to a larger audience at lowered cost; facilitates the distribution and use of wireless telephones; reduces the expense of wireless telephones and wireless telephone services; promotes the use of wireless telephones and wireless telephone services by those who otherwise would not invest in a wireless telephone and expend funds for wireless telephone services; facilitates the availability of wireless telephones and wireless telephone services for emergency uses; provides added convenience in obtaining as well as using wireless telephones and wireless telephone services.

It is to be understood that the above detailed description of preferred embodiments of the invention is provided by way of example only. Various details of design, construction and procedure may be modified without departing from the true spirit and scope of the invention, as set forth in the appended claims.

The embodiments of the invention in which an exclusive property or privilege is claimed are defined as follows:

1. A disposable wireless telephone capable of use for telephonic communication by a user only during a predetermined limited period, after which period the telephone itself is rendered incapable of use and is discarded, the telephone comprising:

telephonic means within the telephone itself for transmitting and receiving telephonic communications;

enabling/disabling means within the telephone itself for enabling the telephonic means for telephonic communications during the predetermined limited period and rendering the telephone incapable of use upon expiration of the predetermined limited period;

the enabling/disabling means including setting means for setting the duration of the predetermined limited period prior to delivery of the telephone to the user;

selective operating means within the telephone itself for operating the telephonic means for telephonic communications of selected durations;

the enabling/disabling means including disabling means within the telephone itself and responsive to the selective operating means for rendering the telephone itself incapable of use when the sum of the selected durations reaches the predetermined limited period; and tamper deterrent means within the telephone itself for precluding access to the setting means for any alteration of the duration of the predetermined limited period once the setting means has been set so as to preclude any resetting of the predetermined limited period subsequent to delivery of the telephone to the user such that the telephone itself is rendered incapable of use beyond the predetermined limited period and is capable of being discarded.

2. The invention of claim 1 wherein the setting means includes a source of power of given capacity.

3. The invention of claim 1 wherein the setting means includes a timing mechanism.

4. The invention of claim 1 including a case and the tamper deterrent means includes a matrix material within the case, the telephonic means and the enabling/disabling means being embedded in the matrix material so as to deter tampering.

5. The invention of claim 4 wherein the matrix is constructed of a synthetic polymeric material.

6. The invention of claim 1 including a case having a relatively thin case wall formed of a synthetic polymeric material.

7. The invention of claim 6 wherein the case has an outer configuration and the relatively thin case wall is vacuum formed into the outer configuration.

8. The invention of claim 6 wherein the tamper deterrent means includes a matrix in the case, with the matrix mechanically reinforcing the thin case wall.

9. The invention of claim 8 wherein the telephonic means and the enabling/disabling means are embedded in the matrix so as to deter tampering.

10. A method of using a disposable wireless telephone for telephonic communications during only the duration of a predetermined limited period, after which period the telephone itself is rendered incapable of use and is discarded, the telephone including telephonic means for transmitting and receiving telephonic communications, the method comprising:

setting the duration of the predetermined limited period prior to delivery of the telephone to a user;

enabling the telephonic means itself for telephonic communications during the duration of the predetermined limited period;

operating the telephonic means for telephonic communications of selected durations;

rendering the telephone incapable of use upon the sum of the selected durations reaching the duration of the predetermined limited period; and precluding any alteration of the duration of the predetermined limited period, once the duration of the predetermined limited period is set, subsequent to delivery of the telephone to the user such that the telephone itself is rendered incapable of use beyond the predetermined limited period and is capable of being discarded.

11. The invention of claim 10 wherein:

setting the duration of the predetermined limited period is accomplished with setting means placed within the telephone itself; and alteration of the duration of the predetermined limited period is precluded, once the duration of the predetermined limited period is set, by precluding access to the setting means for resetting subsequent to delivery of the telephone to the user.

12. The invention of claim 11 including:

summing the selected durations; and comparing the sum of the selected durations to the set duration of the predetermined limited period.

13. The invention of claim 10 including discarding the telephone upon expiration of the predetermined limited period.

* * * * *